UNITED STATES PATENT OFFICE.

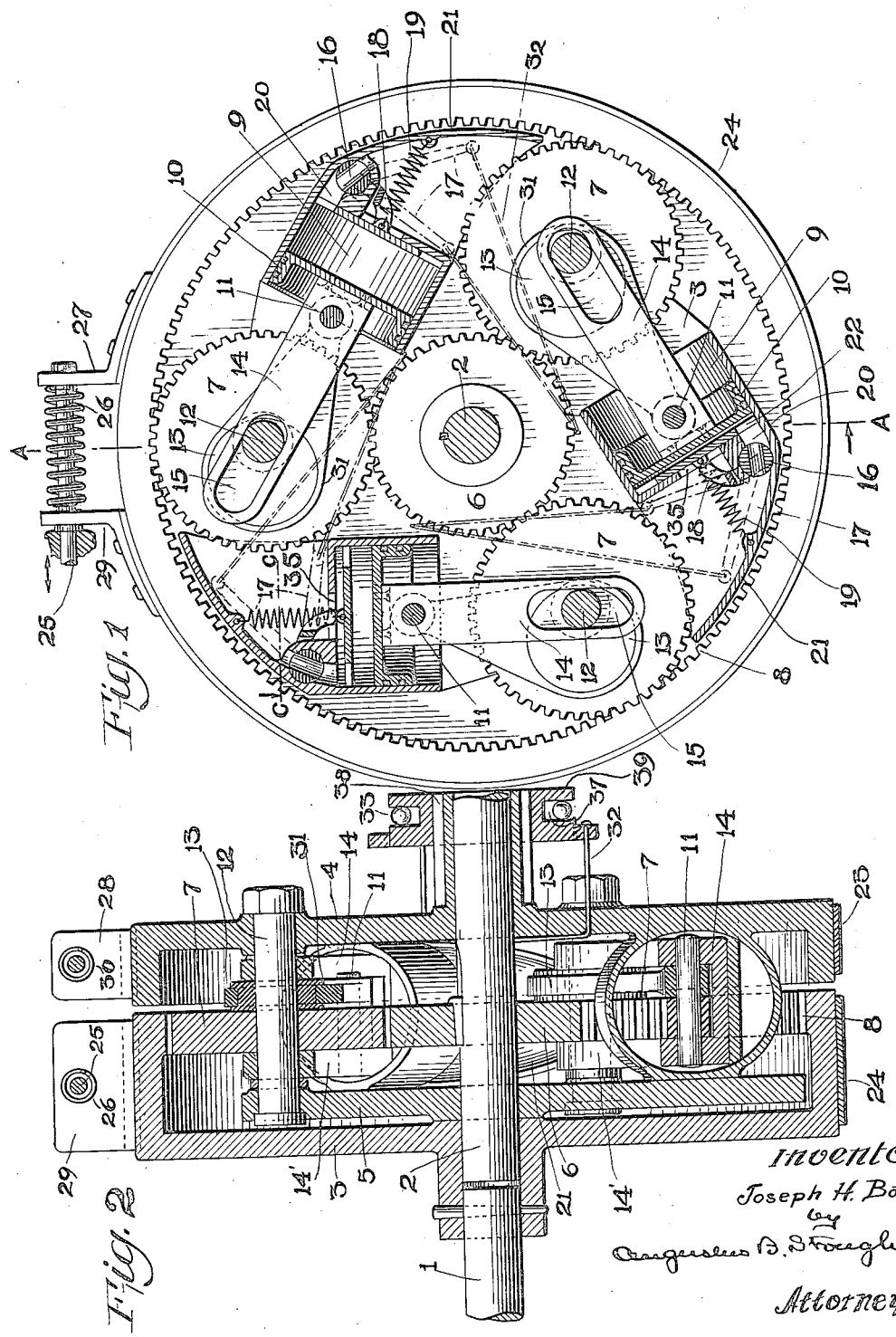

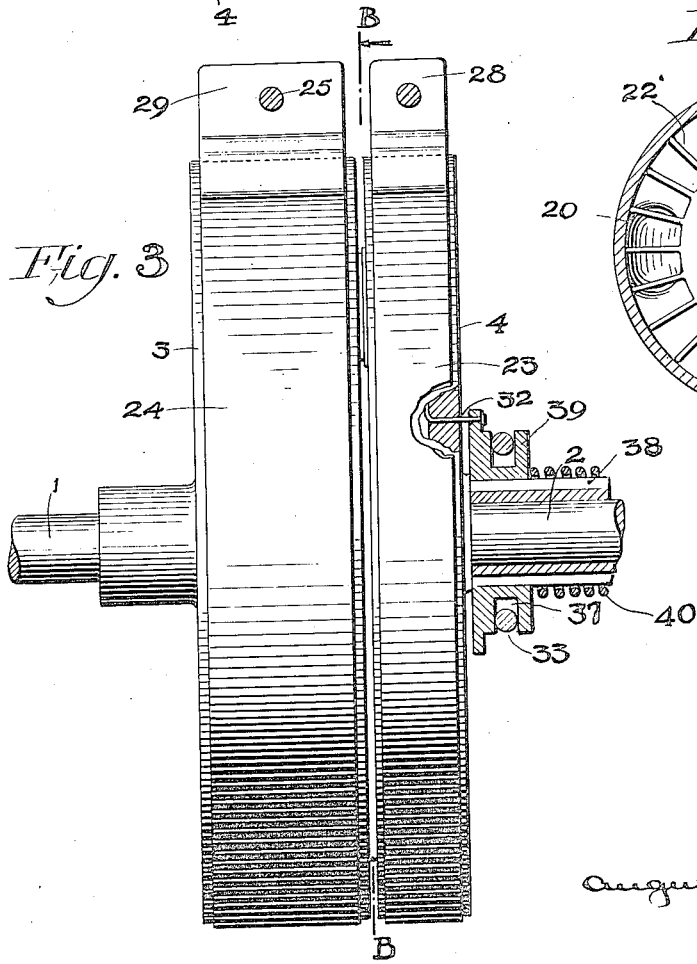

JOSEPH H. BAIR, OF PHILADELPHIA, PENNSYLVANIA.

VARIABLE-SPEED AND VARIABLE-POWER GEAR.

1,285,585.

Specification of Letters Patent.

Patented Nov. 26, 1918.

Application filed October 30, 1917. Serial No. 199,220.

*To all whom it may concern:*

Be it known that I, JOSEPH H. BAIR, a citizen of Philadelphia, Pennsylvania, have invented a new and useful Variable-Speed and Variable-Power Gear, of which the following is a specification.

My invention relates to a device for controlling the direction, speed and power of a driven shaft.

The object of my invention is to provide a transmitting means which is light in weight, durable and compact in construction, which serves all the requirements of clutch and change-gears now employed in automobiles, which is practical and reliable to operate and through which flexibility of power and speed is procured by the sliding operation of a single lever without unmeshing of gears.

In construction the device is made up of a single set of gears, in mesh all the time, whether in neutral, low, high or reverse. These gears are in the following relation to each other: The driver and driven shafts (in the application of the principle I use for illustration) are in line, with ends abutting. On the driven shaft end abutting is an internal gear, fast thereon, and into whose hub extends the driver shaft and forms a bearing therein. On the driver shaft and in line with the teeth of the internal gear is fast a pinion. This pinion is connected with the internal gear by means of three intermediate gears having their bearing on an arbor free on the driver shaft. This arbor has on it controlling means which consist, 1. of a drum and brake-band to lock it from turning with the driver and, 2. means to check the free revolution of the three intermediate gears thereon. This checking- and locking-against-rotation-means consists (for each intermediate gear) of an eccentric fast with it on its spindle, a piston in a cylinder and a pitman rod connecting said eccentric with its piston and a controllable check-valve to determine the freedom of intake and ejection of oil therethrough.

The operation of the gear is as follows: In neutral (*i. e.* when the driver, which runs with a constant speed and torque, transmits no turning pressure to the driven shaft) the brake band on the intermediate gear arbor drum is loose, and the piston check valves are entirely open allowing the oil to be sucked in and expelled from the cylinders with practically no resistance. In this condition driven shaft stands still and the internal gear thereon forms a track for the intermediate gears to run on and the arbor, upon which these intermediate gears are mounted, idles in the direction of the driver shaft but at a slower speed and at half the rate the intermediate gear teeth traverse those of the internal gear teeth upon which they idle. In reverse, (*i. e.* when it is required to turn the driven shaft counter to the driver) the stop cock check-valves are left open as in neutral, so that the pistons can oscillate without resistance. The brake-band on the arbor drum is gradually tightened, much as a clutch is allowed to slip in gradually to avoid shock, and its idling is gradually retarded until it is locked firmly and the internal gear and the driven shaft fast thereon run counter to the driver pinion. The internal gears serve merely to reverse the motion of the respective shafts and of decreasing the speed and increasing the turning pressure relevant to the respective teeth of driver and driven gears. In forward driving, (*i. e.* when driver and driven shafts are required to turn in the same direction) starting with neutral (presupposing that it is desirable to start the engine before conveyance is put into motion) the stop-cocks are gradually closed so that the oil is ejected from the cylinders with more and more difficulty and the piston oscillations offer more and more resistance to the turning pressure of the intermediate gears. At that point where the turning resistance thus produced exceeds the turning resistance of the load (*i. e.* the inertia of the track formed by the internal gear for the intermediate gears) the track gradually yields and is pushed along and the intermediate gears revolve less and less freely. At the point where the stop cocks are entirely closed the pistons are checked from all oscillations, the intermediate gears cannot turn, because the eccentrics on their respective shafts serve as keyways and lock them, and they are made to serve as spokes solidly locking driver and driven gears together and all turn together in high, and there is no loss of speed or power from driver to driven elements.

When the load becomes too heavy in high and more power is desired the stop-cocks are opened a desired amount to cause sufficient slippage of the driven shaft to bring up its turning torque to meet the occasion. In shifting from neutral to high all the intermediate speeds are traversed—and inversely the powers. The maximum power is at that point where in closing the stopcocks the inertia of the load is overcome and the vehicle starts. By this method it is not possible to get an indefinite turning torque on the driven member at the expense of speed—the variation of power and speed being within the ratio limits of the respective driver and driven gears. If, as is desirable in automobile gearing, the driven member has three and a half times as many teeth as the driver, then (as in reverse) the driver turns 7/3 as rapidly as the driven shaft but with only 3/7 the turning torque thereof. In forward driving, when the internal gear (the track) is forced along 3/7 as fast as the driver the turning torque of driver and driven shafts are respectively 3:7. As this track is allowed to slip, less and less until it is made to turn at the same pace as the driver the respective speeds of driver and driven members are equal, $i.\ e.$, 1:1.

It may be noted here that where the flexible means of transmission is a gear-lever with a variably yielding fulcrum the only way in which turning torque of driven member can be increased over that of driver, and, as is always the case, at the expense of speed, is by means of the gear ratio of driver and driven members—the driven member having as many times the number of teeth of driver as it is possible to increase its turning torque over that of driver.

The accompanying drawings illustrate my invention, of which Figure I is a sectional end view on the line B—B of Fig. III and shows the principle embodied in the invention.

Fig. II is a cross section on line A—A of Fig. I.

Fig. III is a side view of the gear with a part cut away to show how the stop cock rods are attached to a sliding collar on a sleeve of the arbor.

Fig. IV is a section on the line C—C of Fig. I and shows detail of construction of stop-cock and an arm on control lever.

Fig. VI is a detail of oscillating closure valve in cylinder, looking from piston end, showing also stop cock port; while Fig. V is a detail of the valve detached in plan.

In these drawings housing and bearings for transmission shaft are not shown, but it is required that the entire gear be inclosed in a liquid tight case which must be kept partly filled with oil when the gear is operative.

To the driven shaft 1 is fast the internal gear 3. To driver shaft 2 (which has its free end supported in a bearing formed by the hub of gear 3 into which it extends) is fast a driver pinion 6. Having its bearing on this shaft 2 is an arbor 4—5 upon which are mounted three intermediate gears 7 by means of cross shafts 12 which also have each an eccentric 13.

On member 4 of the arbor is an annular flange which serves as a drum for the brakeband 23 to act upon to accomplish reverse driving as already described. This brakeband 23 terminates in two ears 27 and 29 which are brought together and made to act upon the drum by clamping it by a draw bolt 25 all in a manner well known and in common use. On arbor member 4 are also cast cylinders 9, (preferably three in number) one for each eccentric 13 and intermediate gear 7, which extend across and are fastened to member 5 thereof. These cylinders head in the direction the gear turns. In the head of each cylinder 9 is a large hole 5 which allows oil to flow, or be drawn into the cylinder upon the in stroke of the piston 10 therein. Over the head end of each cylinder is a scoop 21. Whenever oil is required for the proper control of the pistons 10 in the respective cylinders 9 the arbor 4—5 travels forward so as to make the scoop 21 effective in supplying a solid body of oil to the ports 20 and 35 which are in that part of the bowl formed by scoop 21 which is opposite the direction of travel. The outer edge of the scoop 21 is curved to conform with an arc of the circle which it describes in whirling around on the shaft 2 so that the impact of oil on the base of the bowl has neither centrifugal nor centripetal action.

The cross shaft 12 upon which intermediate gear 7 and eccentric 13 are fast has its end spindles supported in bearings formed in arbor members 4 and 5, with no end play. In each cylinder 9 piston 10 is connected with its eccentric 13 by means of a pitman strap 31 and bearing pin 11 in the piston. Fast to the piston 10 is a double arm (U shaped) guide bar 14 having guide slots 15 through which shaft 12 extends, and between which guide arms is included snugly the eccentric 13.

In the head of each cylinder 9 are the two ports, one large one 35 in the center, and a small one 20 registering with stop-cock 16 on the outer rim. Overlying port 35 is a closure plate 22 (Figs. 5 and 6) with legs 22' radially extending and with ends joined by circular web (not shown) and in its center is an eyelet 34 by which to engage the end of a tension spring 19 which normally holds the plate tight down in its closure position with a pull of not over 15 pounds to the square inch of its area so that it can be displaced to admit oil upon the in- or suction stroke of the piston 10 whose suction limit is 15 pounds to the square inch of its area. The stop-cock 16 is controlled by an arm 17 and a push rod 32 connecting it with a grooved slidable collar 39 which collar has a transverse slot for a key 38 on the sleeve of the arbor member 4 upon which it is made to slide laterally, back and forth, by a bifurcated arm (not shown) with pins 33 in its free ends to engage with the groove 37 therein. The slidable collar 39 is normally kept in its in position (adjacent the arbor) thus holding open the stop-cock 16 by means of a pressure spring 40 on the arbor sleeve. The bifurcated arm, (not shown) controlling the stop-cocks, just described is a lever fulcrumed in the middle, having its lower bifurcated end engaging the slidable collar and its upper end forming either a pedal suitably placed to push with the foot, or a lever to be actuated by hand. By this means the forward speeds are controlled.

In the position of the stop-cock control mechanism when the stop-cock ports 20 are in perfect registration the bifurcated arm 18 for each cylinder fast on the stop-cock arm 17, presses with its fingers 36 against intake plate 35 holding it away from its closure position and allowing oil to pass in and out freely upon the oscillation of the piston thus offering no turning resistance to the intermediate gear 7 in controlled relation with the gears 3 and 6 intermeshing with it. This is a requirement for effecting neutral, in which case the driven gear 3 stands still under the resistance of the load, (plus also, if required, under that of the transmission brake effected by the tightening of band 24 on the drum 8 of the driven gear 3,) while the driven gear 6 runs without resistance and the intermediate gears 7 idle. The parts 6, 7, 4—5, and 8 constitute an embodiment of a planetary transmission, using spur gears.

I claim:

1. In a device of the class described the combination of a planetary transmission including an arbor and an intermediate gear, a cylinder on said arbor, a piston for the cylinder, an eccentric for the gear, a pitman between the piston and eccentric, and a guide connected with the piston and provided with a fork straddling the eccentric and pitman, substantially as described.

2. In a device of the class described the combination of a planetary transmission including an arbor and an intermediate gear, a cylinder on said arbor, a piston for the cylinder, an eccentric for the gear, a pitman between the piston and eccentric, and a guide connected with the piston and provided with a fork straddling the eccentric and pitman and slotted to engage the shaft on which the eccentric is mounted, substantially as described.

3. In a device of the class described the combination of a planetary transmission including an arbor and an intermediate gear, a cylinder on said arbor, a piston for the cylinder, an eccentric for the gear, a pitman between the piston and eccentric, a stop cock for the cylinder, a spring closed valve for the cylinder, and controlling means for positioning said cock and valve and for permitting the latter to work free, substantially as described.

4. In a device of the class described the combination of a planetary transmission including an arbor and an intermediate gear, a cylinder on said arbor, a piston for the cylinder, an eccentric for the gear, a pitman between the piston and eccentric, means for flooding the transmission with lubricant, and scoops coöperating with the piston, substantially as described.

5. In a device of the class described the combination of alined driver and driven shafts, a pinion fast on the driver shaft, an internal gear fast on the driven shaft, brake means for the internal gear, an intermediate gear, an arbor carrying the intermediate gear, brake means for the arbor, and brake means for the intermediate gear.

6. In a device of the class described the combination of a planetary transmission including an arbor and an intermediate gear, a cylinder on said arbor, a piston for the cylinder, an eccentric for the gear, a pitman between the piston and eccentric, a stop cock for the cylinder, a spring closed valve for the cylinder, and controlling means for positioning said cock, substantially as described.

JOSEPH H. BAIR.